United States Patent [19]
Bent

[11] 3,798,910
[45] Mar. 26, 1974

[54] AIR POWERED ROTARY WIRE CUTTING AND WRAPPING TOOL

[75] Inventor: John H. Bent, Fullerton, Calif.

[73] Assignee: H. F. Wilson Engineering Company, Glen Ellen, Ill.

[22] Filed: Oct. 13, 1971

[21] Appl. No.: 188,751

[52] U.S. Cl. .................... 60/718, 91/61, 92/2, 140/118
[51] Int. Cl. ............................................. F01b 21/00
[58] Field of Search ............... 92/2; 60/6, 10; 91/61

[56] References Cited
UNITED STATES PATENTS

| | | | |
|---|---|---|---|
| 2,081,760 | 5/1937 | Nardone | 92/2 X |
| 2,154,555 | 4/1939 | Baer et al. | 92/2 X |
| 2,553,584 | 5/1951 | Hirsch et al. | 60/6 |
| 2,854,870 | 10/1958 | Chaffee et al. | 91/61 X |
| 3,051,136 | 8/1962 | Muehlhausen | 91/61 X |
| 3,094,845 | 6/1963 | Gali Mallofre | 60/6 X |
| 3,386,340 | 6/1968 | Engle | 92/2 X |

Primary Examiner—Edgar W. Geoghegan
Assistant Examiner—Abe Hershkovitz
Attorney, Agent, or Firm—Lyon & Lyon

[57] ABSTRACT

A tool for cutting a wire to length and then wrapping it around a terminal post includes an air motor driving through a planetary gear reduction to rotate a spindle, and a wire contacting bit rotated by the spindle. In order to develop sufficient torque to sever the wire at the bit, there is provided a member constrained to move helically with respect to the spindle housing, and the member is actuated by an air operated piston. A clutch between said member and the spindle disengages upon predetermined axial travel of said member to permit free turning of the spindle by the air motor to accomplish the wire wrapping operation. A spring returns said member to its initial position after the supply of air to the air motor and piston is cut off and the clutch automatically aligns the spindle and bit into initial position for insertion of another wire. One end of the spindle is supported within the bore of the inner race of an anti-friction bearing assembly in the housing. One end of a bit driving shaft is supported in the same bore and adjacent parts of the spindle and shaft are formed to provide a driving connection. The rotary bit is enclosed within a stationary sleeve and the wire is severed at the junction of an axial groove on the periphery of the bit and an axial groove on the stationary sleeve. Discharge of exhaust air from the tool is silenced by an oil collecting filter mounted within the handle of the tool.

9 Claims, 17 Drawing Figures

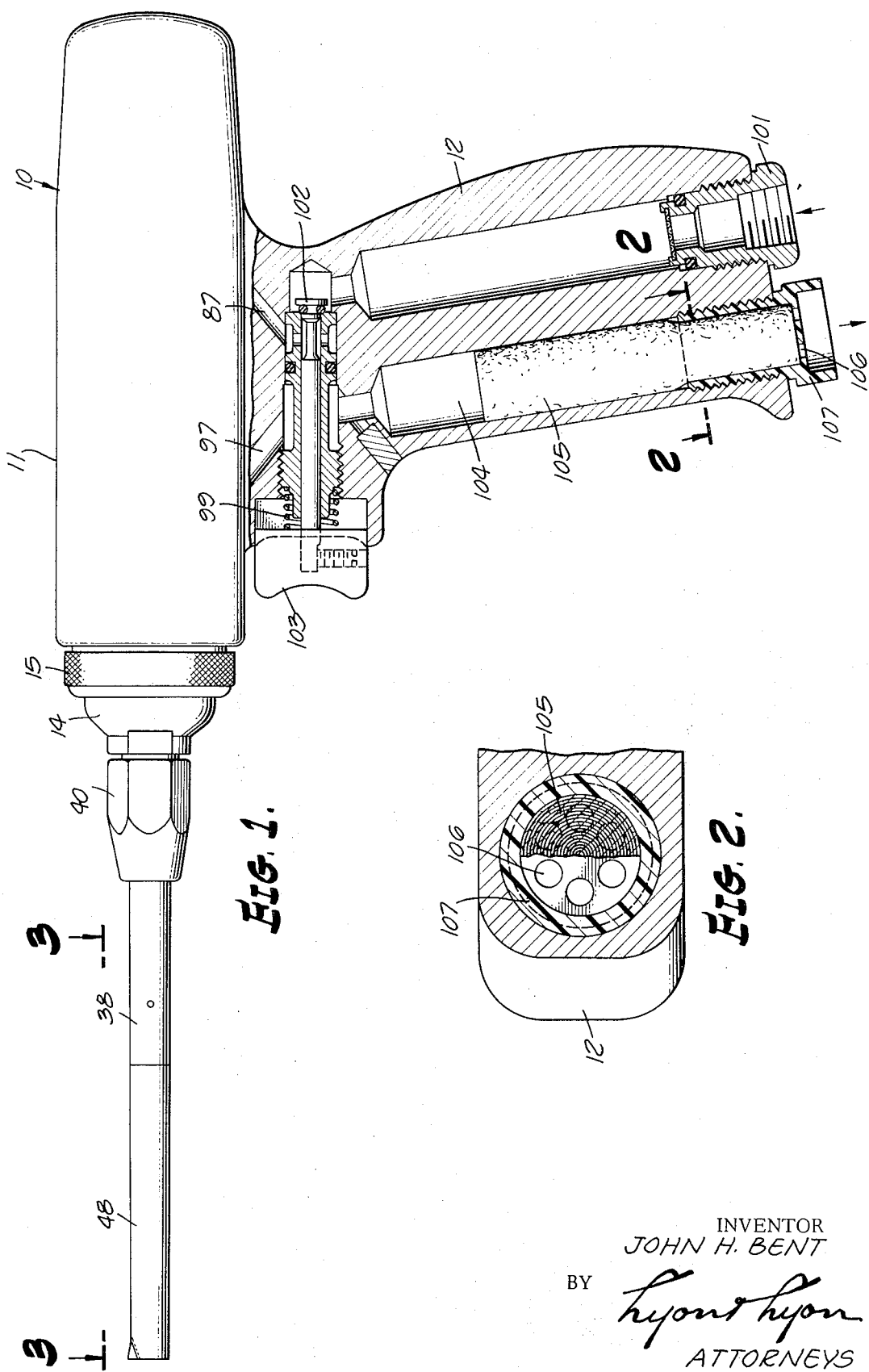

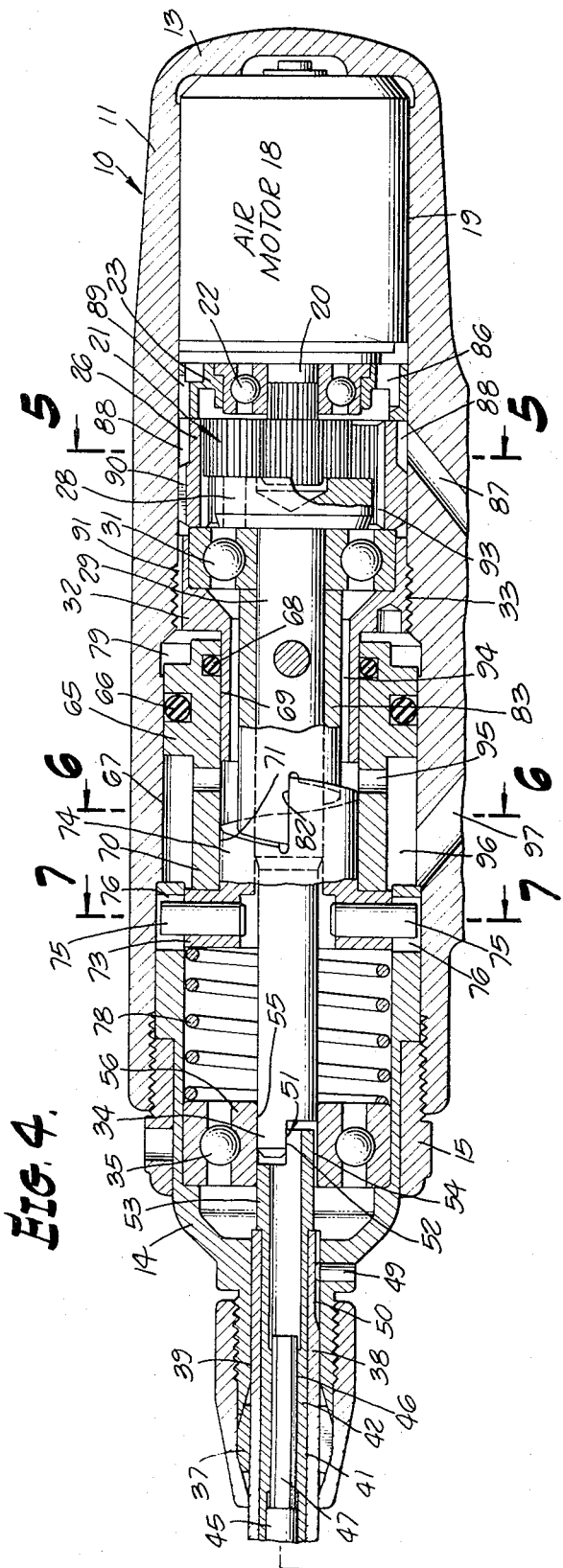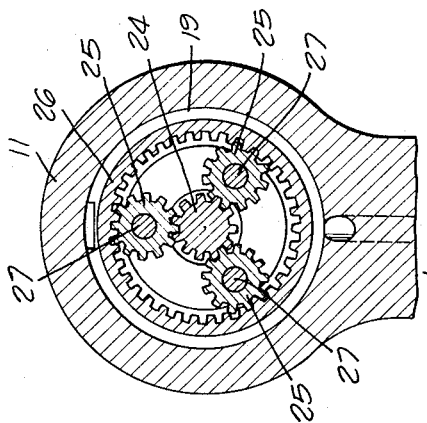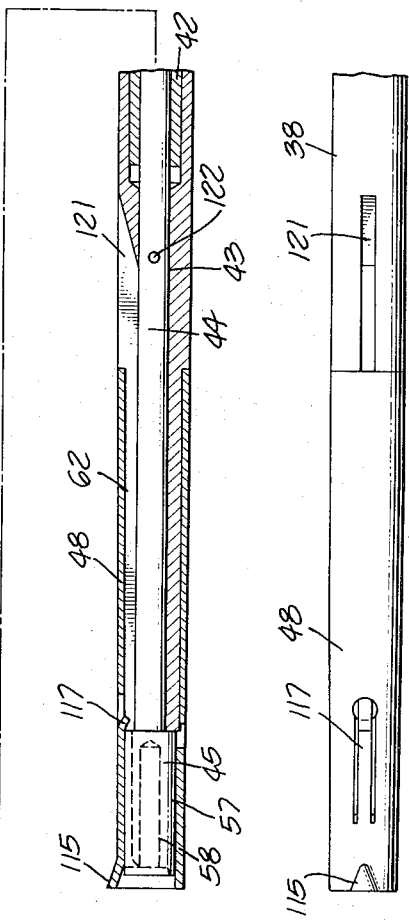
INVENTOR
JOHN H. BENT
BY
*Lyon & Lyon*
ATTORNEYS

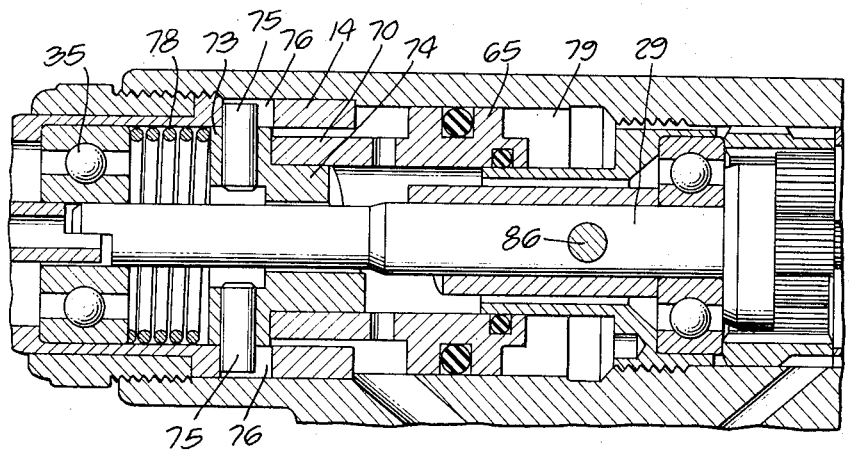
FIG. 9.
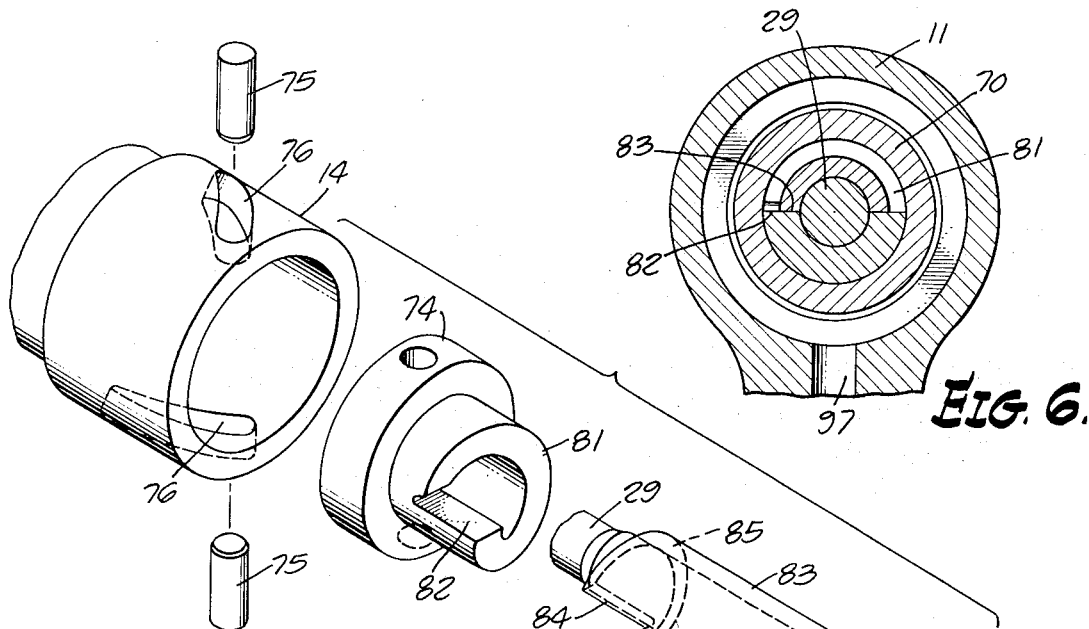
FIG. 6.
FIG. 8.
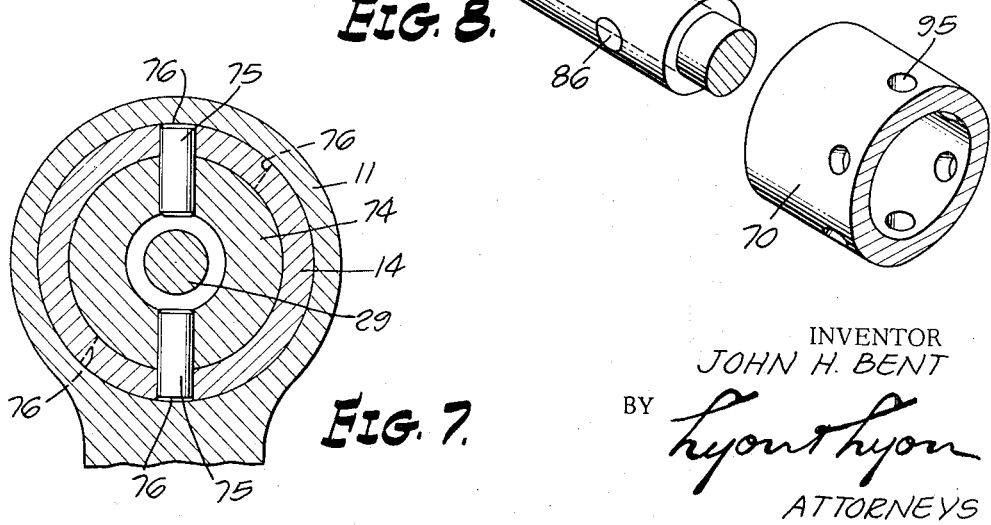
FIG. 7.
INVENTOR
JOHN H. BENT
BY Lyon+Lyon
ATTORNEYS

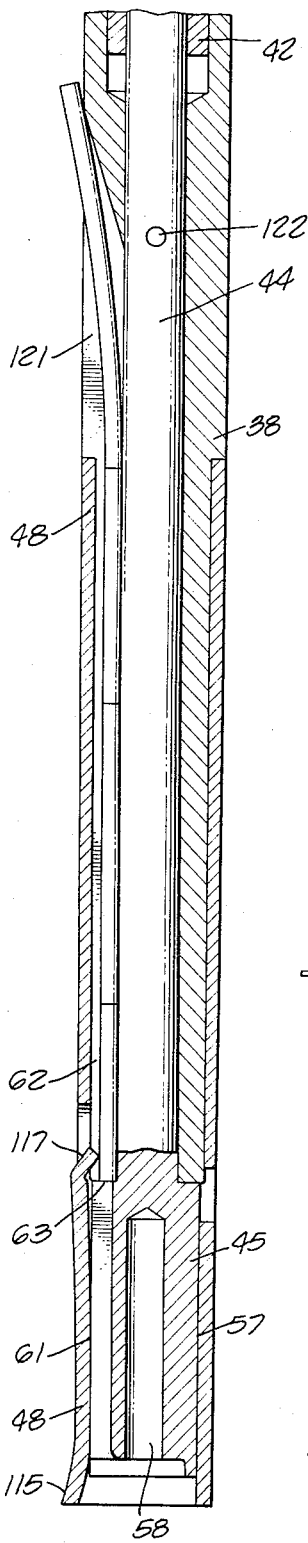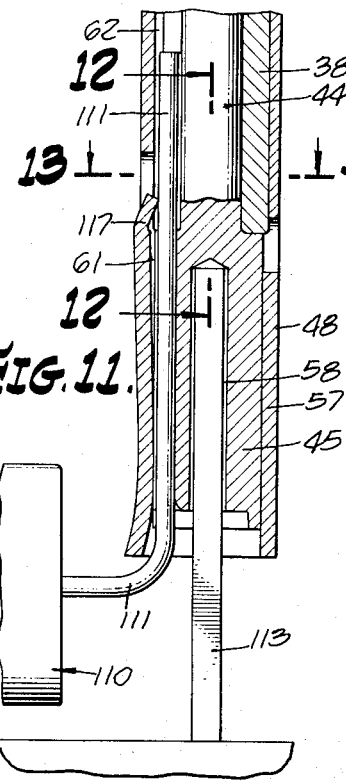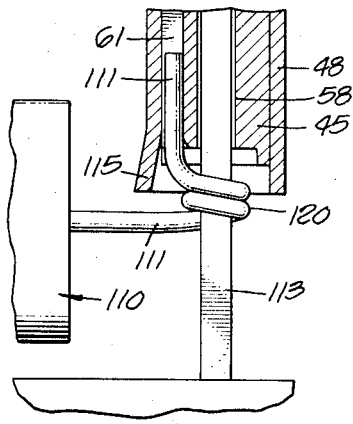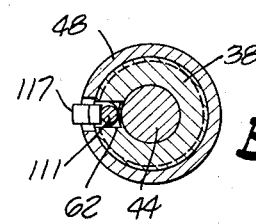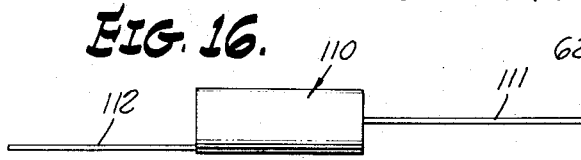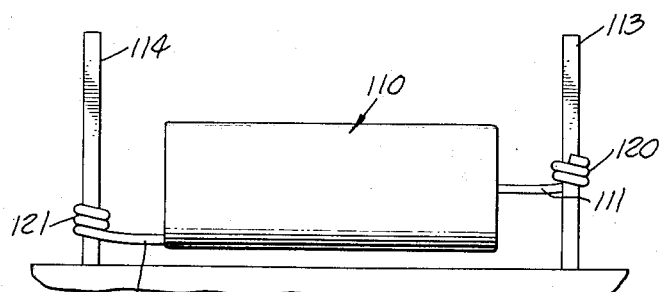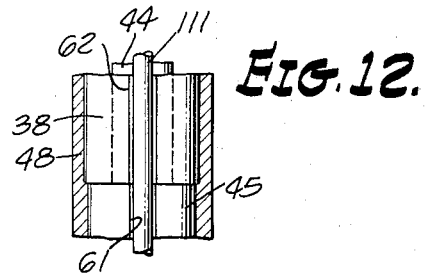

AIR POWERED ROTARY WIRE CUTTING AND WRAPPING TOOL

This invention relates to an air powered rotary wire cutting and wrapping tool which is used to shear a wire and then wrap it around a terminal. In particular, the tool may be used to connect the lead wires of electronic assemblies to stationary terminal posts. The lead wires from electronic assemblies such as condensers, resistors, "networks" and the like are longer than necessary and therefore a length of the lead wire is cropped or severed prior to wire wrapping the lead wire in a helical fashion around a stationary terminal post.

Wire wrapping tools powered by air motors are known but the torque available from an air motor of a size needed to perform the wire wrapping operation is too small to shear the wire until the motor turns fast enough to develop centrifugal force to maintain its vanes in efficient sealing relationship with the enclosing cylinder wall. Accordingly, sufficient torque to sever the wire initially and prior to the wrapping operation cannot be obtained in a hand-held tool unless an air motor of excessive size and weight is employed. In accordance with this invention, a small air motor of light weight is employed which is adequate to perform the wire wrapping operation, and an air operated torque-increasing mechanism is employed for generating sufficient torque under startup conditions to sever the wire. The torque-increasing mechanism includes a clutch which desengages after the wire has been severed to permit the air motor and its spindle to turn free during the wire wrapping operation. When the supply of air is cut off, a spring returns the air operated torque-increasing mechanism to its initial position where the clutch arrests movement of the spindle and brings it to a predetermined angular position so that the bit and sleeve are oriented to receive another length of wire.

Another feature of the invention lies in the provision of a novel form of support and drive connection between the spindle driven by the air motor and the drive shaft for the bit driven by the spindle. One end of the spindle is supported within the bore of the inner race of an anti-friction bearing assembly, and the adjacent ends of a tubular drive shaft for the bit is mounted within the same bore. Driving faces are provided on the adjacent ends of the spindle and drive shaft.

Another feature of this invention resides in the provision of a silencer in the handle of the device to receive the exhaust air from the tool and substantially cut down the noise. The silencer is formed of filter material which collects oil in the exhaust air and prevents it from soiling the skin or clothing of the operator.

Other and more detailed objects and advantages will appear hereinafter.

In the drawings:

FIG. 1 is a side elevation partly in section showing a preferred embodiment of this invention.

FIG. 2 is a sectional detail taken substantially on the lines 2 — 2 as shown in FIG. 1.

FIG. 3 is a plan view showing a portion of the device on an enlarged scale, and taken in the direction of the lines 3 — 3 as shown in FIG. 1.

FIG. 4 is a sectional elevation partly broken away, the internal parts being shown in the at-rest position.

FIGS. 5, 6 and 7 are transverse sectional views taken substantially on the lines 5 — 5, 6 — 6 and 7 — 7 as viewed in FIG. 4.

FIG. 8 is an exploded view showing the manner of assembly of certain internal parts of the device.

FIG. 9 is a sectional elevation similar to FIG. 4, but showing the internal parts in the running position.

FIG. 10 is a sectional elevation showing the forward portion of the tool on an enlarged scale.

FIG. 11 is a view similar to FIG. 10 partly broken away and showing a lead wire from an electronic assembly in position to be cut and subsequently wrapped around a terminal post.

FIG. 12 is a sectional detail taken substantially on the lines 12 — 12 as shown in FIG. 11.

FIG. 13 is a transverse sectional view taken substantially on the lines 13 — 13 as shown in FIG. 11.

FIG. 14 is a view similar to FIG. 13 but showing the wire being wrapped after being cut.

FIG. 15 is a view similar to FIG. 11 but showing the progress of wrapping the wire around the terminal post.

FIG. 16 is a side elevation showing a typical form of electronic assembly prior to the cutting and wrapping operations.

FIG. 17 is a view showing an electronic assembly after both lead wires have been cut and wrapped around spaced parallel terminal posts.

Referring to the drawings, the wire cutting and wrapping tool generally designated 10 includes a housing 11 formed integrally with a handle 12 and having a closed end 13. The housing 11 is generally cylindrical and is closed at the other end by a nose piece 14 and a threaded retainer ring 15. The nose piece 14 functions as an integral part of the housing.

An air motor assembly 18 is positioned within the bore 19 of the housing adjacent the end wall 13. This air motor assembly 18 may be of conventional design and construction, having a rotor with centrifugally urged vanes slidably engaging an eccentric bore. The air motor shaft 20 projects from one end of the air motor 18 to drive a planetary gear assembly 21 used as a speed reducer. The air motor shaft 20 is supported by an anti-friction bearing assembly 22 mounted within a stationary bearing ring 23 contained within the housing bore 19. A sun gear 24 (FIG. 5) is formed on the projecting end of the air motor shaft 20 and meshes with the planet gears 25, which in turn mesh with the enclosing internal stationary ring gear 26 positioned within the housing bore 19. The planet gears 25 are carried on parallel axially extending pins 27 fixed in the end flange 28 of the rotary spindle 29. This spindle 29 is supported by an anti-friction bearing assembly 31 carried in bearing ring 32 mounted within the housing bore 19 and connected thereto by threads 33. The end 34 of the spindle 29 remote from the flange 28 is supported within an anti-friction bearing assembly 35 carried by the nose piece 14. From this description it will be understood that rotation of the air motor shaft 20 drives through the planetary gear reduction assembly 21 to turn the spindle 29 within its supporting bearing assemblies 31 and 35.

A stationary sleeve 38 is received within the bore 39 of the nose piece 14 and is clamped in position by means of a sleeve nut 40 and a split nylon bushing 37. The stationary sleeve 38 projects forwardly from the nose piece 14 and is provided with a large diameter bore 41 for reception of the tubular drive shaft 42 and a small diameter bore 43 for reception of the shank portion 44 of the rotary bit 45. A non-circular socket 46 is provided in the tubular drive shaft 42 and this socket receives a correspondingly shaped drive portion 47 of the bit 45. The socket 46 and the drive portion 47 may both be hexagonal in shape. A stationary tube 48 is fixed on the projecting end of the sleeve 38 and functions as an integral part thereof.

The tubular drive shaft 42 has a driving connection 51 with the end portion 34 of the spindle 29. A portion of the tubular drive shaft 42 is supported within the inner race of the anti-friction bearing assembly 35. The driving connection 51 is formed through mating drive faces 52 which extend radially on both parts 29 and 42. The cylindrical portion 53 on the tubular drive shaft 42 is provided with a flat surface 54 at one side, which flat surface is parallel to the radial drive faces 52. This construction permits assembly of the tubular drive shaft 42 axially with clearance over the press-fitted pin 49 which engages the alignment groove 50 in the end of the sleeve 38. The bore 55 of the inner race 56 of the anti-friction bearing assembly 35 has full-circle contact with the end 34 of the spindle 29, but the contact between the bore 55 and the tubular drive shaft 42 extends for only slightly less than 360° because it is interrupted by the flat surface 54.

Cooperative action between the rotary bit 45 and the stationary sleeve 38 serves to shear a wire and then wrap it around a stationary terminal received within the open ended bore 58 of the bit 45, all as described in detail below. The wire to be cut projects into an axial groove 61 on the periphery of the enlarged head 57 of the bit 45 and also extends into an axial groove 62 provided on the outer cylindrical surface of the stationary sleeve 38. The wire is cut at the junction 63 between the groove 61 in the rotating bit 45 and the groove 62 in the stationary sleeve 38. The shearing action to sever the wire requires more torque than the air motor assembly 18 acting through the planetary gear reduction 21 can develop at a standing start. The torque value developed by vane-type air motors of conventional design at zero RPM is low, and an acceptable torque output occurs only as centrifugal force acts on the vanes during rotation.

In accordance with this invention, apparatus is provided to increase the torque available from the spindle 29 at startup conditions, in order to shear the wire between the bit 45 and the sleeve 38 prior to wrapping of the wire around the terminal projecting into the bore 58. As shown in the drawings, this means includes an annular piston 65 having an external seal ring 66 which slides within the housing bore 67 and an internal seal ring 68 which slides on the outer cylindrical surface 69 provided on the bearing support ring 32. This piston 65 has a tubular extension 70 which is press-fitted over the cylindrical portion 71 of the index driver member 74 so that the piston 65 and member 74 move as a unit. The flange 73 of this member 74 is provided with a pair of oppositely extending radial pins 75 which extend into helix grooves 76 provided in the stationary nose piece 14. A coil compression spring 78 is positioned within the nose piece 14 and extends between the outer race of the anti-friction bearing assembly and the flange 73 on the member 74. When air under pressure is supplied to the chamber 79, the piston 65 moves axially from the at-rest position as shown in FIG. 4 to the running position as shown at FIG. 9, moving the member 74 and compressing the spring 78. The axial movement of the member 74 under thrust from the piston 65 is accompanied by rotary turning movement of the member 74 and piston 65 as the radial pins 75 move along the helix grooves 76.

The member 74 has a helical surface 81 extending to opposite ends of a clutch face 82. An index sleeve 83 is provided with a corresponding clutch face 84 and a corresponding helical surface 85 extending to opposite ends of the face 84. In the at-rest position shown in FIG. 4, the faces 82 and 84 are in surface contact for substantially their full axial length, and the helical surfaces 81 and 85 are in contact. The sleeve 83 is fixed to the spindle 29 by means of cross pin 86. When air pressure acting on the piston 65 causes the member 74 to move in a helical manner, the driving face 82 acts on the driven face 84 to turn the member 83 and spindle 29 in the same direction as the air motor turns the spindle. While this turning motion is taking place, the member 74 is moving axially away from the member 83, the driving face 84 sliding axially with respect to the driven face 82. When the member 74 has separated axially from the member 83, the initial high torque requirements for severing the wire at the bit 45 have been met, and the wire has been severed. The air motor assembly 18 then continues to rotate the spindle 29 until the wire wrapping operation has been completed.

The air supply to the air motor assembly 18 and to the piston 65 enters the housing 11 through the inlet port 87 and into the annular space 88. The air then passes through passage 89 to the air motor assembly 18 and through passages 90 and 91 to the chamber 79 behind the piston 65. The exhaust from the air motor assembly 18 passes through port 86 and passage 93 through the anti-friction bearing assembly 31, passage 94, and through ports 95 into the space 96 between the piston extension 71 and the housing bore 67. The exhaust air then escapes through outlet port 97 in the housing 11. As shown in FIG. 1, air admitted through inlet bushing 101 in the handle 12 passes through air valve 102 under control of manually operated trigger 103. Pressure on the trigger 103 opens the valve 102 against spring 99 to permit air to pass through the inlet port 87 to the air motor assembly 18 and to the piston 65, as previously described. Exhaust air passing through port 97 enters the cavity 104 in the handle 12 and passes through the silencer 105 for discharging to the atmosphere through ports 106 in the bushing 107. The silencer 105 is formed of suitable filter material which serves to trap oil droplets in the air stream and prevent them from being discharged through the ports 106, thereby preventing soiling of the hands or clothing of the user of the tool 10. The silencer 105 effectively muffles the objectionable sounds of air being discharged from the air motor assembly 18.

Referring to FIGS. 10–17, the electronic assembly generally designated 110 may comprise a condenser, resistor, "network" or other item having a pair of lead wires 111 and 112. The tool 10 is used to cut the lead wires to length and wrap them around the spaced parallel terminal posts 113 and 114. These terminal posts may have any suitable or desirable cross section shape and are small enough to be received within the cylindrical open ended bore 58 in the bit 45. One of the lead wires 111 is first manually inserted into the open end of the bit groove 61. This insertion operation is facilitated by the presence of the "V" shaped protuberance 115 at the extreme forward end of the stationary tube 48. When the internal parts of the tool are at rest, the groove 61 is aligned with this protuberance 115. The wire 111 is then manually bent and the tool 10 and electronic assembly 110 are moved to position the stationary terminal 113 within the open ended bore 58 of the bit 45. The parts are then in the position shown in FIG. 11. A finger 117 on the encircling stationary tube 48 frictionally contacts the wire 111 as it lies in the stationary groove 62.

When the trigger 103 on the handle 12 is depressed to admit air under pressure to the air motor assembly 18 and to the piston chamber 92, the bit 45 is turned relative to the stationary sleeve 38 so that the wire 111 is sheared at the junction 63 between the groove 61 in the rotating bit 45 and the groove 62 in the stationary sleeve 38. The rotating bit 45 then begins to wrap the wire 111 to form a continuous helix 120 in tight engagement with the stationary terminal post 113. FIG. 15 shows the position of the parts during the wrapping operation, the extending end of the wire 111 being drawn axially out of the groove 61 as the bit 45 rotates to form the helix 120. The short length of wire cropped from the portion wrapped around the terminal post 113 is prevented from sliding out of the stationary groove 62 by the frictional contact of the finger 117. As additional short lengths of cropped wire are pushed into the stationary groove 62 past the friction finger 117, they accumulate in the groove 62 until they pass outward through the exit slot 121 in the wall of the sleeve 38. It will be noted that the discharge of these short lengths of cropped wire occurs at a location remote from the wire winding operation, thereby minimizing the chance that the short length wires may fall into the assembly of terminals and electronic components to cause short circuits or other difficulties.

After the wrapping of wire 111 around terminal post 113 has been completed, the air valve trigger 103 is released to permit the spring 99 to close the valve 102 and thus shut off the supply of air to the air motor assembly 18 and piston 65. The spring 78 within the housing 11 then moves the index driver 74 back to the initial position shown in FIG. 4. The surfaces 82 and 84 engage to stop rotation of the spindle 29 and to bring the groove 61 in the rotating bit 45 into alignment with the groove 62 in the stationary sleeve 38. The tool 10 is withdrawn axially from the terminal post 113 as soon as the wire is wrapped. The lead wire 112 from the electronic assembly 110 is then inserted into the groove 61 in the bit 45, and the tool 10 is positioned to place the terminal post 114 within the open ended bore 58 of the bit 45. The air trigger 103 is manually depressed and the cycle repeats to shear the wire 112 and then wrap it as a helix 121 around the terminal post 114. The completed assembly is shown in FIG. 17.

It will be noted that the action of the piston 65, index driver 74 and index sleeve 83 is to add to the starting torque of the air motor assembly sufficiently to shear the wire under startup conditions. The parts 74 and 83 disengage so that the air motor assembly alone performs the subsequent wire wrapping operation. After the supply of air is cut off at the conclusion of the wire wrapping operation, reduction in air pressure permits the spring 78 to return the parts to initial position in which the helix surfaces 81 and 85 and the flat surfaces 84 and 82 serve to bring the spindle 29 to a stop at a predetermined angular position, and this angular position insures that the groove 61 in the rotary bit 45 is aligned with the groove 62 in the stationary sleeve 38, ready for the next insertion of a wire. The spindle 29 is ordinarily turned in the reverse direction for part of a revolution during this return to the predetermined angular position.

The stationary sleeve 38 and the bit 45 with its shank 44 may be replaced when worn or when a different size wire or terminal post is to be used. It is necessary to preserve the angular and axial alignment of the sleeve and bit when coupling them to the nose piece 14 and tubular drive shaft 42, respectively. This is readily accomplished by inserting a cross pin temporarily in the aligned transverse apertures 122, thereby holding the parts in proper relative position while connecting them to the nose piece and tubular drive shaft. After the connection is complete, the transverse pin is removed.

While the term "air" is used in the specification and claims, it is to be understood that this term is to be construed to cover any gas.

Having fully described my invention, it is to be understood that I am not to be limited to the details herein set forth but that my invention is of the full scope of the appended claims.

I claim:

1. In combination, a housing having at least one helical slot, a spindle mounted to rotate in said housing, an air motor connected to rotate said spindle, a member in the housing having an element thereof received in said helical slot, pressure responsive means for moving the member axially to initiate turning movement of said spindle, said means including releasable clutch means to permit free turning of the spindle by the air motor after the initial turning movement, and valve-controlled means for delivering air under pressure to both said air motor and said pressure responsive means.

2. In combination, a housing, a spindle mounted to rotate in said housing, an air motor connected to rotate said spindle, torque-applying means in said housing to initiate turning movement of said spindle, said means including a member connected to the housing for helical movement and also including a releasable clutch to permit free turning of the spindle by the air motor after the initial turning movement, axially movable pressure responsive means in said housing for actuating said torque-applying means, and valve-controlled means for delivering air under pressure to both said air motor and said pressure responsive means.

3. In combination, a housing, a spindle mounted to rotate in said housing, an air motor connected to rotate said spindle, a member mounted in said housing and encircling said spindle, cooperating parts connecting said member and said housing whereby said member is constrained to move helically about the spindle axis, means including releasable clutch means whereby said member may initiate turning movement of said spindle and thereafter permit free turning movement of said spindle by said air motor, axially movable pressure responsive means in said housing for moving said member helically, and means for delivering air under pressure to both said air motor and said pressure responsive means.

4. The combination set forth in claim 3 in which said cooperating parts form a pin-and-slot connection.

5. The combination set forth in claim 3 in which resilient means are provided within the housing to oppose movement of said member by said pressure responsive means.

6. The combination set forth in claim 3 in which planetary gear means within the housing connect the air motor to said spindle.

7. In combination, a housing, a spindle mounted to rotate in said housing, an air motor connected to rotate said spindle, torque-applying means helically connected to said housing to initiate turning movement of said spindle, said means including a member having releasable clutch means to permit free turning of the spindle by the air motor after the initial turning movement, axially movable pressure responsive means in said housing for actuating said torque-applying means, resilient means acting on said member to oppose action of the pressure responsive means, valve-controlled means for delivering air under pressure to both said air motor and said pressure responsive means, whereby upon shutoff of the air supply the resilient means returns the torque-applying means to its initial position so that the clutch means arrests turning movement of the spindle and brings it to rest in a predetermined angular position with respect to said housing.

8. In combination, a housing, a spindle mounted to rotate in said housing, means whereby said spindle may be rotated, a member mounted in said housing and encircling said spindle, cooperating parts including a pin on the member engaging a helical slot on the housing whereby said member is constrained to move helically about the spindle axis, cooperating means on said member and spindle providing a clutch releasable through axial movement of said member whereby said member may initiate turning movement of said spindle and thereafter permit free turning movement of said spindle by the first said means, and axially movable pressure responsive means in said housing for moving said member axially.

9. In combination, a housing, a spindle mounted to rotate in said housing, means whereby said spindle may be rotated, a member mounted in said housing and encircling said spindle, cooperating parts including radial pins on the member engaging helical slots on the housing whereby said member is constrained to move helically about the spindle axis, cooperating clutch jaws on said member and spindle releasable through axial movement of said member whereby said member may initiate turning movement of said spindle and thereafter permit free turning movement of said spindle by the first said means, and axially movable pressure responsive means in said housing for moving said member axially.

\* \* \* \* \*